United States Patent [19]

Igarashi et al.

[11] Patent Number: 4,650,025
[45] Date of Patent: Mar. 17, 1987

[54] VEHICLE WITH POWER UNIT

[75] Inventors: Susumu Igarashi; Norihiko Ito, both of Saitama, Japan

[73] Assignee: Honda Giken Kogyo Kabushiki Kaisha, Tokyo, Japan

[21] Appl. No.: 788,340

[22] Filed: Oct. 17, 1985

[30] Foreign Application Priority Data

Oct. 17, 1984 [JP] Japan .................. 59-217591

[51] Int. Cl.$^4$ .......................................... B62K 25/20
[52] U.S. Cl. ................................................ 180/227
[58] Field of Search ............... 180/227, 228, 218, 219, 180/223, 230

[56] References Cited

U.S. PATENT DOCUMENTS

| 4,261,105 | 4/1981 | Love | 180/227 |
| 4,324,306 | 4/1982 | Ishihara | 180/228 |
| 4,372,417 | 2/1983 | Yamamoto | 180/228 |
| 4,373,602 | 2/1983 | Tomita | 180/227 |
| 4,436,174 | 3/1984 | Morisono | 180/227 |
| 4,460,057 | 7/1984 | Kohyama | 180/219 |
| 4,567,958 | 2/1986 | Ishihara | 180/227 |

FOREIGN PATENT DOCUMENTS

| 197702 | 5/1958 | Austria | 180/227 |
| 38-12215 | 7/1964 | Japan | |
| 2035929 | 6/1980 | United Kingdom | |
| 2074961 | 11/1981 | United Kingdom | |

Primary Examiner—John A. Pekar
Attorney, Agent, or Firm—Irving M. Weiner; Joseph P. Carrier; Pamela S. Burt

[57] ABSTRACT

A vehicle including a vehicle frame and a power unit suspended from the vehicle frame in a manner to reduce the amplitude of vibration generated by the power unit and also the vibration transmitted to the vehicle frame. The power unit comprises a case, an engine integrally coupled to the case, a drive wheel rotatably supported on the case, and a transmission mechanism disposed in the case for transmitted power from the engine to the drive wheel. The power unit is supported on the vehicle frame by a linkage mechanism and a cushioning unit, the engine having a center where vibratory forces are produced and an associated direction in which primary vibratory forces are produced. The linkage mechanism includes a link extending in a direction substantially normal to the engine-associated direction. The power unit is constructed such that a first straight line extending horizontally and transversely of the vehicle frame through the center of gravity of the power unit and a second straight line extending through the engine's center in the engine-associated direction substantially intersect each other.

4 Claims, 3 Drawing Figures

VEHICLE WITH POWER UNIT

BACKGROUND OF THE INVENTION

1. Field of the Invention

The present invention relates to a vehicle with a power unit, and more particularly to such a vehicle having a suspension capable of preventing engine vibration from being propagated from the power unit to a vehicle frame.

2. Description of Relevant Art

There are known two- and three-wheeled motorcycles having a power unit composed of an engine and a transmission case, which is suspended from a vehicle frame through a linkage mechanism and a damper or cushioning unit. One known way of reducing engine vibration transmitted from the power unit to the vehicle frame has been to apply primary engine vibratory forces in the direction in which the link swings, as disclosed in Japanese Patent Publication No. 38-12215. However, there has still been a demand for a larger reduction of the engine vibration transmitted to the vehicle frame, especially from power units having a larger cylinder volume or piston displacement and an increased weight.

Another drawback associated with known two- and three-wheeled motorcycles is that the transmission case is disposed on one side of the rear wheel, so that the center of gravity of the power unit is displaced, as seen from above the vehicle, transversely of the vehicle from the center where primary vibratory forces of the engine are produced. With the center of gravity of the power unit being thus displaced, the power unit is subject to rotational vibration around its vertical axis. Such rotational vibration becomes larger as the center of gravity of the power unit is displaced to a larger extent. The rotational vibration acts as a couple of forces on the link interconnecting the power unit and the vehicle frame, and hence is propagated to the vehicle frame.

SUMMARY OF THE INVENTION

In view of the above drawbacks of the conventional vehicle with the power unit, it is an object of the present invention to provide a vehicle having a power unit suspension capable of lowering the amplitude of vibration generated by the power unit, and to thereby reduce the engine vibration transmitted to the vehicle frame.

Another object of the present invention is to provide a vehicle having a power unit suspension which, where the center of gravity of the vehicle's power unit is transversely displaced from the center where primary rotational forces of the engine are produced, can lower vibration arising from such displacement of the center of gravity of the power unit to reduce the engine vibration transmitted to the vehicle frame.

According to the present invention, a vehicle includes a vehicle frame and a power unit suspended from the vehicle frame. The power unit comprises a case, an engine integrally coupled to the case, a drive wheel rotatably supported on the case, and a transmission mechanism disposed in the case for transmitted power from the engine to the drive wheel.

The power unit is supported on the vehicle frame by a linkage mechanism and a cushioning unit, the engine having a center where vibratory forces are produced and an associated direction in which primary vibratory forces are produced. The linkage mechanism includes a link extending in a direction substantially normal to the engine-associated direction. The power unit is constructed such that a first straight line extending horizontally and transversely of the vehicle frame through the center of gravity of the power unit and a second straight line extending through the engine's center in the engine-associated direction substantially intersect each other.

According to an embodiment, the linkage mechanism has a first end coupled to the vehicle frame and a second end coupled to the power unit in the vicinity of the first straight line.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
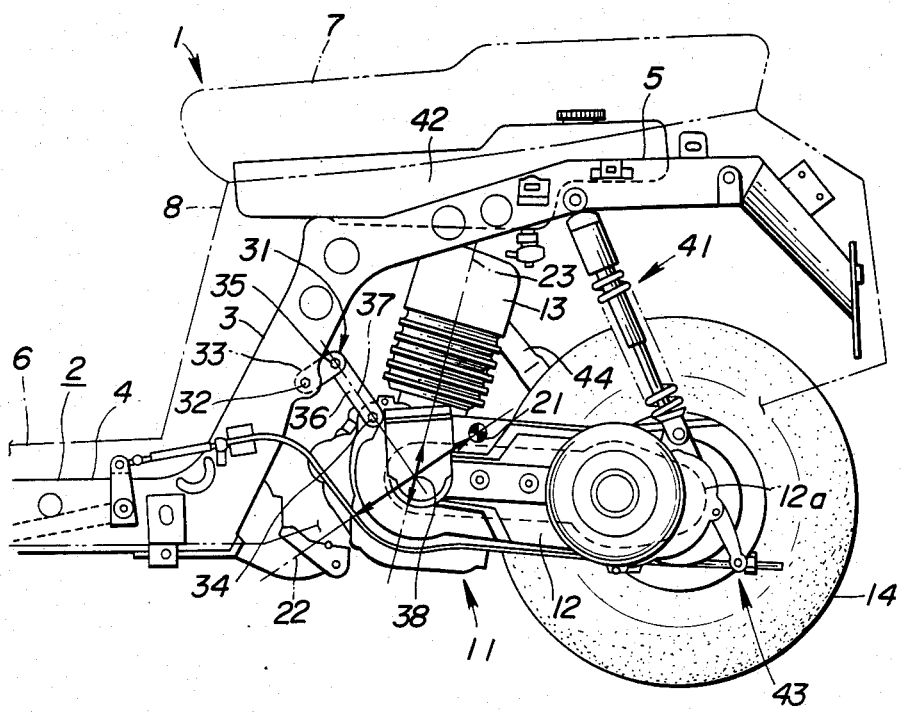
FIG. 1 is a side elevational view of a rear portion of a two-wheeled motorcycle having a power unit suspension according to a first embodiment of the present invention.

As shown in FIG. 1, a two-wheeled motorcycle 1 having a power unit suspension according to a first embodiment of the present invention has a vehicle frame 2 supporting on its front portion a front fork (not shown) on which a front wheel (not shown) is rotatably supported and which can be steered by a handle (not shown).

The vehicle frame 2 includes a seat post 3, a down frame 4 extending forwardly from the lower end of the seat post 3, and a pair of rear frames 5 extending rearwardly from the upper end of the seat post 3. A footrest floor 6 is disposed above the down frame 4, and an openable rider's seat 7 is supported on the seat post 3. The motorcycle 1 also includes a frame cover 8.

A power unit 11 is positioned below the rear frames 5. The power unit 11 comprises a transmission case 12 housing a transmission 12a, and a single-cylinder engine 13 integrally projecting obliquely upwardly from the front portion of the transmission case 12. A rear wheel 14 is rotatably supported on the rear end of the transmission case 12 and can be driven by the engine 13 through the transmission 12a. The power unit 11 has a center of gravity 21 located near the front and upper portions of the transmission case 12. Major vibratory forces produced by engine operation and acting on the engine body arise from movement of the piston, the connecting rod, and the crankshaft with counterweights. It is known that these major vibratory forces are transmitted from the crankshaft through its bearings to the engine body. Therefore, the point 38 where the combined force of such vibratory forces is imposed on the engine body is positioned in substantial alignment with the point where the axis of the crankshaft and the cylinder axis 23 intersect each other for the illustrated single-cylinder engine 13. The point 38 is referred herein to as a center where engine vibratory forces are produced. The direction 22 in which the amplitude of the vibration on the point 38 is maximum can be varied by changing the phase or angular position of the counterweights with respect to the crankshaft. The direction 22 is referred herein to as a direction in which primary vibratory forces are produced. In the illustrated embodiment, power unit 11 is constructed such that the direction or straight line (second straight line) 22 passes through the center 38 and substantially crosses a straight line (first straight line) passing horizontally through the center of gravity 21 transversely of the motorcycle, i.e., perpendicularly to the sheet of FIG. 1.

Secondary (2nd harmonics) vibratory forces of the engine 13 are produced along the cylinder axis 23 of the engine 13. The secondary vibratory forces are produced since the speed of reciprocating movement of the piston is deviated from exact sine-wave motion because the end of the connecting rod which is attached to the crankshaft revolves upon vertical reciprocating movement of the piston.

The power unit 11 is coupled at its front end to the seat post 3 through a linkage mechanism 31.

The linkage mechanism 31 is composed of a first link 33 pivotally supported on the seat post 3 by a pivot shaft 32, and a second link 36 pivotablly supported on the power unit 11 by a pivot shaft 34 and pivotally connected to the first link 33 by a pivot shaft 35. The second link 36 extends in a direction 37 substantially normal to the direction 22 in which the primary vibrational forces are produced, so that the vibration in the direction 22 can efficiently be absorbed by the swinging movement of the second link 36. The crankshaft of the engine 13 is positioned at the point 38 where the cylinder axis 23 and the directions 22, 37 intersect each other.

The pivot shafts 32, 34, 35 are fitted with rubber blocks (not shown) for resiliently suppressing the vibration of the first link 33 with respect to the vehicle frame 2, the vibration of the second link 36 with respect to the first link 33, and the vibration of the power unit 11 with respect to the second link 36. For example, each of such rubber blocks may be of a hollow cylindrical shape, and inner and outer metal pipes may be fixedly fitted in and over each of the cylindrical rubber blocks and secured to the members to be joined. The structure of such a rubber block is known in the art.

The rear portion of the transmission case 12 is suspended by a damper or cushioning unit 41 from the rear frames 5.

The motorcycle also includes a fuel tank 42, a rear wheel braking mechanism 43, and an exhaust pipe 44 connected to a muffler (not shown).

The vibration of the power unit 11 in the direction 22 can be absorbed by the second link 36 as it swings, and the smaller vibration of the power unit 11 in the direction 23 can be absorbed by the first and second links 33, 36 as they swing.

Since the direction 22 in which the primary vibrational forces are produced passes through the center of gravity 21 of the power unit 11 as seen in side elevation of the motorcycle 1, the amplitude of the vibration of the power unit 11 in the direction 22 can be reduced by the mass of the power unit 11 to reduce the engine vibration transmitted to the vehicle frame 2. Therefore, the primary and secondary vibratory forces can be absorbed by the first and second links 33, 36 without having to provide any balancer.

The direction 22 may pass through the center of gravity 21 of the power unit 11 as seen in both side elevation and plan of the motorcycle 1 for effectively preventing the power unit 11 from being subject to rotational vibration about the center of gravity 21 thereof.

Figure 2:
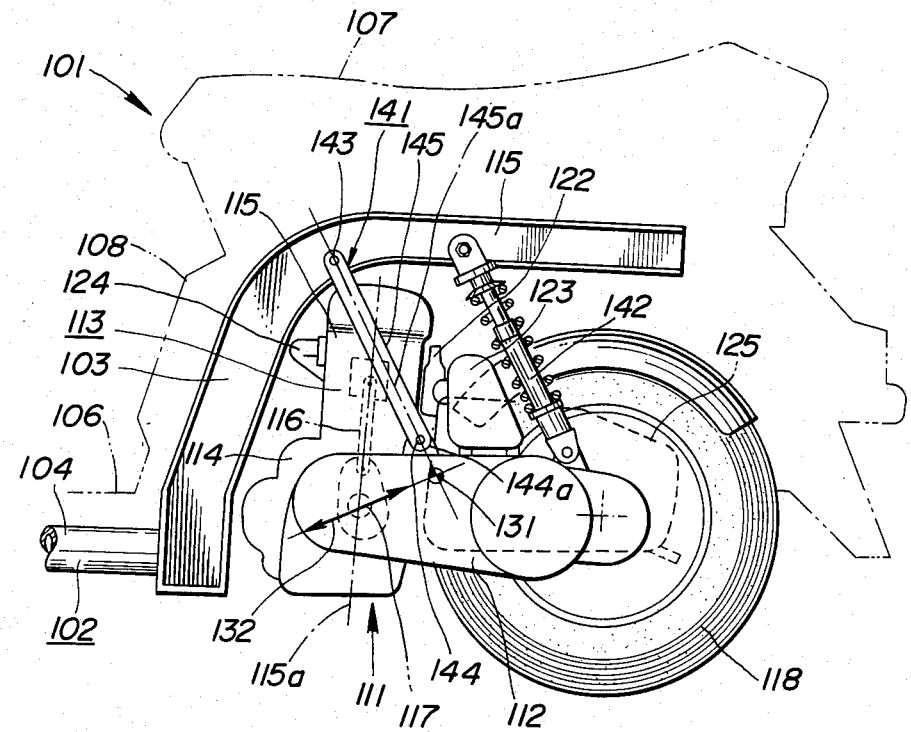
FIG. 2 is a side elevational view of a rear portion of a two-wheeled motorcycle having a power unit suspension according to a second embodiment of the present invention.
Figure 3:
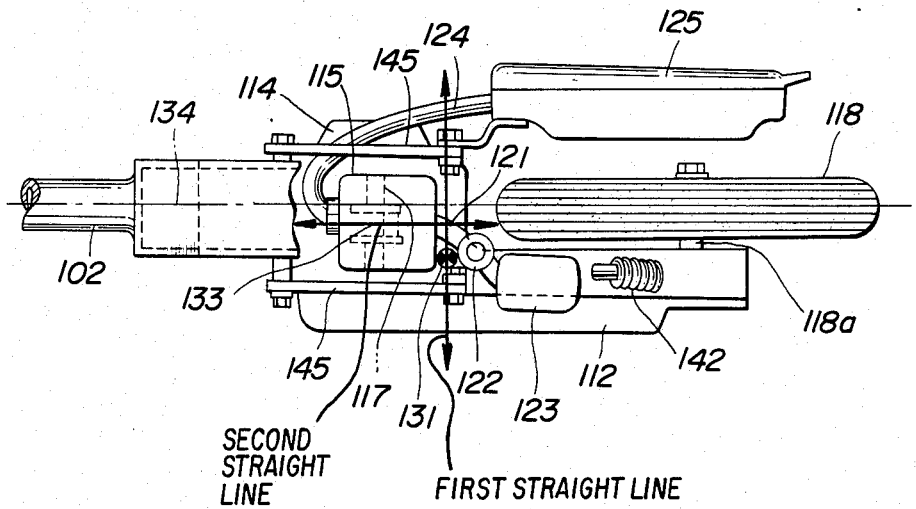
FIG. 3 is a plan view of the rear portion of the two-wheeled motorcycle shown in FIG. 2.

FIGS. 2 and 3 illustrate a motorcycle 101 having a power unit suspension according to a second embodiment of the present invention. The motorcycle 101 has a vehicle frame 102 composed of a down frame 104 extending forwardly from the lower end of a seat post 103 and a rear frame 105 extending rearwardly from the upper end of the seat post 103. A footrest floor 106 is disposed above the down frame 104, and an openable rider's seat 107 is supported on the seat post 103. The motorcycle 101 also includes a frame cover 108.

A power unit 111 is positioned below the rear frame 115. The power unit 111 comprises a transmission case 112 and an engine 113 integrally coupled thereto. The engine 113 has a single cylinder 115 projecting obliquely upwardly from the front portion of a crankcase 114 thereof. Primary vibratory forces of the engine 113 are produced where a connecting rod 116 is coupled to a crankshaft 117, and secondary (2nd harmonics) vibratory forces of the engine 113 are generated along a cylinder axis 115a.

A rear wheel 118 has an axle 118a rotatably supported by the rear end of the transmission case 112 and can be driven by power transmitted from the engine 113 through the transmission case 112.

An intake pipe 121 is connected to the rear side of the cylinder 115. A carburetor 122 and an air cleaner 123 connected therewith are positioned above the transmission case 112. An exhaust pipe 124 extends from the front side of the cylinder 115 in the rearward direction, and is connected at its rear end to a muffler 125.

The power unit 111 has a center of gravity 131 where a second straight line corresponding to the second straight line 22 of FIG. 1 and a first straight line corresponding to the first straight line of FIG. 1 intersect each other. More specifically, the direction 132 in which primary vibratory forces of the engine 113 are imposed is oriented substantially toward the center of gravity 131 as seen in side elevation (FIG. 2), and the center of gravity 131 is positioned transversely leftwardly of the center 133 where engine vibratory forces are produced as seen in plan (FIG. 3). Designated at 134 in FIG. 3 is a longitudinal central axis of the motorcycle 101.

The power unit 111 is suspended from the vehicle frame 102 by a linkage mechanism 141 and a damper or cushioning unit 142.

The linkage mechanism 141 comprises a pair of transversely spaced links 145 pivotally supported on a front portion of the rear frame 105 by a pivot shaft 143 and on an intermediate portion of the transmission case 112 by a pivot shaft 144. The pivot shafts 143, 144 are fitted with rubber blocks (not shown). The links 145 extend in a direction 145a substantially normal to the direction 132 in which the primary vibratory forces are produced, so that the vibration in the direction 132 can effectively be absorbed by the link 145 as it swings.

The point 144a where the links 145 and the power unit 111 are coupled to each other is located in the vicinity of the center of gravity 131 as seen in side elevation. Specifically, the ends of the links 145 are connected to the power unit 111 closely to the first straight line. The rubber blocks on the opposite ends of the links 145 serve to resiliently suppress the vibration of the links 145 with respect to the vehicle frame 102 and the vibration of the power unit 111 with respect to the links 145. The cushioning unit 142 is connected between the rear frame 105 and the rear end of the transmission case 112.

The major vibration of the power unit 111 in the direction 132 can be absorbed by the links 145 as they swing, and the smaller secondary vibration of the power unit 111 in the direction 115a can also be absorbed by the links 145 as they swing.

Since the direction 132 is oriented to pass through the center of gravity 131, the amplitude of the vibration of the power unit 111 in the direction 132 can be reduced by the mass of the power unit 111, thus reducing the engine vibration transmitted to the vehicle frame 102.

Inasmuch as the point 144a where the link rods 145 are attached to the power unit 111 is disposed in the vicinity of the center of gravity 131, the freedom of any vibration of the power unit 111 arising from the deviation of the center of gravity 131 from the center 133 can be limited and thereby suppress the vibration due to such deviation of the center of gravity 131, so that the engine vibration transmitted to the vehicle frame 102 can be reduced.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:
1. A vehicle comprising:
a vehicle frame;
a power unit suspended from said vehicle frame and comprising a case, an engine integrally coupled to said case, a drive wheel rotatably supported on said case, and a transmission mechanism disposed in said case for transmitting power from said engine to said drive wheel;
said power unit being supported on said vehicle frame by a linkage mechanism and a cushioning unit;
said engine having a center where vibratory forces are produced and an associated direction in which primary vibratory forces are produced;
said power unit being constructed such that a first straight line extending horizontally and transversely of the vehicle frame through the center of gravity of the power unit and a second straight line extending through said engine's center in the direction of said primary vibratory forces substantially intersect each other at a certain point; and
said linkage mechanism including a link pivoted swingably to said vehicle frame and extending in a direction normal to said second straight line.

2. A vehicle according to claim 1, wherein said linkage mechanism has a first end coupled to said vehicle frame and a second end coupled to said power unit in the vicinity of said first straight line, and the central axis of said link extends in a direction to meet said first straight line.

3. A vehicle according to claim 1, wherein said power unit is constructed such that said second straight line passes in the vicinity of said center of gravity.

4. A vehicle according to claim 2, wherein said power unit is constructed such that said second straight line is displaced transversely of the vehicle frame from the center of gravity thereof.

* * * * *